United States Patent [19]

Pickens et al.

[11] 4,312,675
[45] Jan. 26, 1982

[54] HIGH CONCENTRATION POLYMER SLURRIES

[75] Inventors: Patrick A. Pickens, San Diego; Thomas A. Lindroth, Spring Valley; Robert D. Carico, Costa Mesa, all of Calif.

[73] Assignee: Merck & Co., Inc., Rahway, N.J.

[21] Appl. No.: 142,313

[22] Filed: Apr. 21, 1980

Related U.S. Application Data

[63] Continuation-in-part of Ser. No. 23,511, Mar. 23, 1979, abandoned.

[51] Int. Cl.$^3$ .................. C08J 3/02; C08L 1/28; C08L 5/00
[52] U.S. Cl. .................. 106/171; 106/174; 106/175; 106/177; 106/178; 106/186; 106/187; 106/188; 106/189; 106/190; 106/191; 106/205; 106/206; 106/207; 106/208; 106/209; 106/170; 106/316
[58] Field of Search ............... 106/208, 205, 206, 207, 106/209, 177, 190, 191, 197 R, 171, 174, 175, 178, 180, 188, 189, 187, 316

[56] References Cited

U.S. PATENT DOCUMENTS 3,894,879  7/1975  Colegrove .................. 106/189
3,894,880  7/1975  Colegrove .................. 106/208
3,918,981  11/1975 Long ........................ 106/207
3,930,871  1/1976  Starace ..................... 106/205
4,105,461  8/1978  Racciato ................... 106/205

FOREIGN PATENT DOCUMENTS 2243228  4/1975  France .
2018300  10/1979 United Kingdom .

Primary Examiner—Allan Lieberman
Attorney, Agent, or Firm—Gabriel Lopez; Hesna J. Pfeiffer

[57] ABSTRACT

High concentration polymer slurries contain up to 65 weight % xanthan gum in a hydrophobic solvent base treated with suspending agents, dispersants, and thinning agents. Mineral oil, diesel oil, kerosene, alcohols (six to twelve carbons), vegetable oil, ester-alcohols, polyol ethers, and the like may be used as the solvent. The preferred suspending agent is either an organophilic clay or hydroxypropyl cellulose. The preferred dispersant is either an ethoxylated linear alcohol or a fatty acid ester of vegetable oil or animal oil. The preferred thinning agent is lecithin. These slurries greatly improve the dispersibility of xanthan gum or any other hydrophilic colloid, such as guar, hydroxypropyl guar, cellulosics, polyacrylamides, and the like.

10 Claims, No Drawings

HIGH CONCENTRATION POLYMER SLURRIES

CROSS-REFERENCE

This is a Continuation-in-Part of copending application U.S. Ser. No. 023,511, filed Mar. 23, 1979, now abandoned.

DESCRIPTION OF THE PRIOR ART

U.S. Pat. No. 3,894,880 discloses the method of thickening alcohol/water solvent systems with xanthan gum. This system is then used to suspend a slurry of alginates. U.S. Pat. No. 3,894,879 discloses the method of thickening alcohol/water solvent systems with hydroxypropyl cellulose. This system is then used to suspend xanthan gum. The present invention differs from the prior art in that (1) pourable xanthan gum slurries are achieved at polymer concentrations exceeding 50% and (2) nonvolatile solvents prevent crusting of the polymer at the slurry surface.

Other art includes mechanical and chemical means of improving the dispersibility of xanthan gum and other hydrophilic colloids. Mechanical mixers are not completely effective. Chemical means consist of either treating the colloid with materials such as dialdehydes that delay hydration or slurrying the polymer. The slurries of the prior art have two major disadvantages. First, to remain pourable these slurries are limited to polymer concentrations well below 50%. Secondly, volatile solvents in these slurry formulations evaporate when exposed to the atmosphere leaving a crusty film of dried polymer on the surface of the slurry. This crust resists reconstitution into the slurry and is not dispersible in water. In one embodiment, the present invention incorporates a thinning agent such as lecithin, thus allowing pourable slurries at polymer concentrations exceeding 50%. The solvent base is considerably less volatile. No crust formation is encountered.

SUMMARY OF PREFERRED EMBODIMENTS

The polymer to be dispersed is preferably xanthan gum. Other similar hydrophilic colloids can be used in these formulations, such as guar gum, hydroxypropyl guar, cellulosics, polyacrylamides, and the like.

The polymer is employed so that its total weight in the final composition is about 20-65 weight %. A finely-divided form of polymer is preferable (200-mesh, Tyler screen or finer) to achieve these levels. Although particles of fine mesh size and low particle weight are easiest to suspend, these slurries can incorporate a broad range of particle sizes, i.e., including about 30 mesh.

By hydrophobic solvents is meant anhydrous solvents which are insoluble in water and do not solvate or swell hydrophilic colloids, and which have a melting point of no more than 30° C. and a vapor pressure at 20° C. of no more than 1 Torr.

The hydrophobic solvent base can be one or more of the following or similar solvents:

1. aliphatics of the formulae $C_nH_{2n+2}$, $C_nH_{2n}$, and $C_nH_{n+1}$ where n is 6 or greater and mixtures thereof, such as diesel oil, kerosene (white oil), gasoline, mineral oils, and lubricating oils;
2. crude oil distillates such as mineral spirits and mixtures of aliphatics, ketones, aldehydes, esters, ethers, glycols, and alcohols;
3. vegetable oils such as peanut oil, linseed oil, corn oil, cotton oil, and tall oil;
4. primary, secondary, and tertiary alcohols of 6-12 carbons;
5. turpentine;
6. glycol ethers such as phenyl glycol ethers;
7. glycols such as polypropylene glycol of formula weight greater than 1000;
8. ester alcohols such as 2,2,4-trimethylpentanediol-1,3 monoisobutyrite (Texanol ®, Eastman Kodak);
9. animal oils such as fish and beef fat oils;
10. silicone oils; and
11. halogenated solvents.

The solvent is used in about 20-75 weight %. One preferred solvent base is a mixture of diesel oil or kerosene in about equal amounts with a mixture of a 6-10 carbon chain alcohol. Another preferred solvent is mineral oil.

The rest of the slurry is made up of minor amounts of suspending agents, dispersants, and thinning agents.

The preferred suspending agent, present in about 0.05-0.25 weight %, is an organophilic clay or hydroxypropyl cellulose. Hydroxypropyl methylcellulose, hydroxybutyl methylcellulose, aluminum/phosphate soaps, aluminum stearate/fatty acid soaps, dehydrated castor oil, fine-mesh fumed silica, quaternary salts of sodium cellulose (Soloid ®), and similar viscosifiers or thixotropic agents for the before-mentioned solvents can also be used.

The preferred dispersants, which are critical only to the most hydrophobic solvent systems, are ethoxylated linear alcohols. Fatty acid esters of vegetable or animal oils, ethoxylated nonyl phenols, and similar surfactants are also acceptable for dispersion of very hydrophobic solvents of the invention. Ethylene glycol monobutyl ether and other glycol ethers are used as dispersants in less hydrophobic solvent systems. The dispersant when used, is employed in about 0.1-7.0 weight %.

The preferred thinning agent, when used, is lecithin. Lignosulfonate salts, salts of naphthalene formaldehyde condensate and naphthalene sulfonic acid condensate also can be used. The thinning agent is employed in 0.5-1 weight %, preferably about 0.85-0.9 weight %.

The percentages of the above components should add to 100%, so obviously selection of exact amounts from within these ranges can be made by those practicing this invention.

The procedure to make the slurries is generally simple: The solvent base is put in a suitable container, and agitated. The selected dispersing/suspending agents are added, then the polymer is slowly added with agitation until a uniform slurry is obtained. Eductors attached to suitable containers equipped with circulating pumps can also acceptably mix the slurries.

The high concentration polymer slurries of this invention can be used in any application requiring aqueous polymers. They are particularly applicable in conditions of minimal mixing agitation given to the aqueous fluids to be viscosified. Dosages or formulation of the slurry are dependent upon the end use of the slurry or polymer. High concentration polymer slurries are particularly useful in oil field applications. When the high concentration polymer slurry is used, it is mixed into the water to be viscosified under agitation, in a volume sufficient to deliver the desired weight of the polymer, until the polymer is fully hydrated.

The invention is further illustrated by the following examples.

EXAMPLE 1

Mixing Procedure for High Concentration Polymer Slurry

1. Place solvent in a suitable container.
2. Agitate solvent with sufficient shear to allow for incorporation of polymer in Step 4.
3. Add dispersing agents/suspending agents, as required.
4. Add polymer slowly. Mix until slurry is uniform.

| Typical Slurry Formulations | |
|---|---|
| Ingredient | weight % |
| Formulation A | |
| Octyl alcohol | 24.60 |
| Methanol | 2.50 |
| Hydroxypropyl cellulose | 0.25 |
| EGMBE (Ethyleneglycol monobutyl ether) | 0.30 |
| Diesel No. 1 | 21.50 |
| Lecithin | 0.86 |
| Fine mesh xanthan gum | 50.00 |
| Formulation B | |
| Texanol (ester alcohol-Eastman Kodak) | 46.57 |
| Methanol | 2.50 |
| Hydroxypropyl cellulose | 0.06 |
| Lecithin | 0.87 |
| Fine mesh xanthan gum | 50.00 |
| Formulation C | |
| Texanol | 49.13 |
| Lecithin | 0.87 |
| Fine mesh xanthan gum | 40.00 |
| Formulation D | |
| Diesel No. 1 or No. 2 | 47.93 |
| Organophilic clay | 1.00 |
| Lecithin | 0.87 |
| EGMBE (Ethyleneglycol monobutyl ether) | 0.30 |
| Fine mesh xanthan gum | 50.00 |

| | per 100 gal. slurry |
|---|---|
| Formulation E | |
| Mineral oil | 80 gal. |
| Organophilic clay | 8.5 lb. |
| Ethoxylated linear alcohol | 2 gal. |
| Fine mesh xanthan gum | 290 lb. |
| Formulation F | |
| Dodecyl (lauryl) alcohol | 32 gal. |
| Methanol | 3 gal. |
| Ethylene glycol monobutyl ether | 8 gal. |
| Hydroxypropyl cellulose | 2.5 lbs. |
| Kerosene | 30 gal. |
| Lecithin | 10 lb. |
| Fine-mesh xanthan gum | 485 lbs. |

What is claimed is:

1. A high concentration polymer slurry comprising 20–65 weight % of xanthan gum; 20–75 weight % hydrophobic solvent base which is insoluble in water, does not solvate or swell hydrophillic colloids, has a melting point of no more than 30° C., and has a vapor pressure at 20° C. of no more than 1 Torr; 0.05–0.25 weight % suspending agent; and optionally, 0.5–1 weight % thinning agent; and, optionally, 0.1–7.0 weight % dispersant, wherein said hydrophobic solvent base is one or more of:
   1. aliphatics of the formulas $C_nH_{2+2}$, $C_nH_{2n}$, or $C_nH_{n+1}$ wherein n is 6 or greater and mixtures thereof;
   2. mineral spirits, and mixtures of aliphatics, ketones, aldehydes, esters, ethers, glycols, and alcohols;
   3. vegetable oils;
   4. mixtures of diesel oil or kerosene in about equal amounts with primary, secondary, and tertiary alcohols of 6–12 carbons;
   5. turpentine;
   6. glycol ethers;
   7. glycols of formula weight greater than 1000;
   8. 2,2,4-trimethylpentanediol-1,3-monoisobutyrite;
   9. animal oils;
   10. silicone oils; or
   11. halogenated solvents.

2. A slurry of claim 1 wherein the aliphatics are diesel oil, kerosene, gasoline, mineral oil, or lubricating oil; the vegetable oils are peanut oil, linseed oil, corn oil, cotton oil, or tall oil; the glycol ethers are phenyl glycol ethers; the glycols are polypropylene glycol; and the animal oils are fish or beef fat oils.

3. The slurry of claim 1 in which xanthan gum is 200 mesh or finer, Tyler screen.

4. The slurry of claim 1 in which the solvent base is one or more of mineral oil, diesel oil, kerosene, mixtures of diesel oil or kerosene in about equal amounts with 6–12 carbon chain alcohols, vegetable oil, 2,2,4-trimethylpentanediol-1,3-monoisobutyrite, or glycol ethers.

5. The slurry of claim 1 in which the suspending agent is organophilic clay or hydroxypropyl cellulose.

6. The slurry of claim 1 in which the thinning agent is employed and is lecithin.

7. The slurry of claim 1 in which the dispersant is employed and is ethoxylated linear alcohols or fatty acid esters of vegetable or animal oils.

8. A high concentration polymer slurry comprising 20–65 weight % of xanthan gum; 20–75 weight % hydrophobic solvent base which is insoluble in water, does not solvate or swell hydrophillic colloids, has a melting point of no more than 30° C., and has a vapor pressure at 20° C. of no more than 1 Torr; 0.05–0.25 weight % suspending agent; and optionally, 0.5–1 weight % thinning agent; and, optionally, 0.1–7.0 weight % dispersant, wherein said hydrophobic solvent base is one or more of:
   1. aliphatics of the formulas $C_nH_{2n+2}$, $C_nH_{2n}$, or $C_nH_{n+1}$ where n is 6 or greater and mixtures thereof;
   2. mineral spirits, and mixtures of aliphatics, ketones, aldehydes, esters, ethers, glycols, and alcohols;
   3. vegetable oils;
   4. mixtures of diesel oil or kerosene in about equal amounts with primary, secondary, and tertiary alcohols of 6–12 carbons;
   5. turpentine;
   6. glycol ethers;
   7. glycols of formula weight greater than 1000;
   8. animal oils;
   9. silicone oils; or
   10. halogenated solvents.

9. A high concentration polymer slurry comprising 20–65 weight % of xanthan gum; 20–75 weight % hydrophobic solvent base which is insoluble in water, does not solvate or swell hydrophillic colloids, has a melting point of no more than 30° C., and has a vapor pressure at 20° C. of no more than 1 Torr; 0.05–0.25 weight % suspending agent; 0.5–1 weight % thinning agent; and 0.1–7.0 weight % dispersant, wherein said hydrophobic solvent base is one or more of:
   1. aliphatics of the formulas $C_nH_{2n+2}$, $C_nH_{2n}$, or $C_nH_{n+1}$ wherein n is 6 or greater and mixtures thereof;

2. mineral spirits, and mixtures of aliphatics, ketones, aldehydes, esters, ethers, glycols, and alcohols;
3. vegetable oils;
4. primary, secondary, and tertiary alcohols of 6–12 carbons;
5. turpentine;
6. glycol ethers;
7. glycols of formula weight greater than 1000;
8. 2,2,4-trimethylpentanediol-1,3-monoisobutyrite;
9. animal oils;
10. silicone oils; or
11. halogenated solvents.

10. A high concentration polymer slurry comprising 20–65 weight % of xanthan gum; 20–75 weight % hydrophobic solvent base which is insoluble in water, does not solvate or swell hydrophillic colloids, has a melting point of no more than 30° C., and has a vapor pressure at 20° C. of no more than 1 Torr; 0.05–0.25 weight % suspending agent; 0.5–1 weight % thinning agent; and 0.1–7.0 weight % dispersant, wherein said hydrophobic solvent base is one or more of:

1. aliphatics of the formulas $C_nH_{2n+2}$, $C_nH_{2n}$, or $C_nH_{n+1}$ wherein n is 6 or greater and mixtures thereof;
2. mineral spirits, and mixtures of aliphatics, ketones, aldehydes, esters, ethers, glycols, and alcohols;
3. vegetable oils;
4. turpentine;
5. glycol ethers;
6. glycols of formula weight greater than 1000;
7. 2,2,4-trimethylpentanediol-1,3-monoisobutyrite;
8. animal oils;
9. silicone oils; or
10. halogenated solvents.

* * * * *